United States Patent
Byun et al.

(10) Patent No.: US 10,779,332 B2
(45) Date of Patent: Sep. 15, 2020

(54) METHOD AND APPARATUS FOR TRANSMITTING UPLINK DATA IN WIRELESS COMMUNICATION SYSTEM

(71) Applicant: LG ELECTRONICS INC., Seoul (KR)

(72) Inventors: Ilmu Byun, Seoul (KR); Jiwon Kang, Seoul (KR); Heejin Kim, Seoul (KR); Hyunjin Shim, Seoul (KR); Heejeong Cho, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 126 days.

(21) Appl. No.: 16/099,978

(22) PCT Filed: Jun. 1, 2017

(86) PCT No.: PCT/KR2017/005742
§ 371 (c)(1),
(2) Date: Nov. 8, 2018

(87) PCT Pub. No.: WO2017/209541
PCT Pub. Date: Dec. 7, 2017

(65) Prior Publication Data
US 2019/0132881 A1  May 2, 2019

Related U.S. Application Data

(60) Provisional application No. 62/344,981, filed on Jun. 2, 2016.

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0035* (2013.01); *H04L 5/0044* (2013.01);
(Continued)

(58) Field of Classification Search
None
See application file for complete search history.

(56) References Cited

U.S. PATENT DOCUMENTS

2014/0057634 A1* 2/2014 Chang ................ H04W 36/32
455/437
2014/0119313 A1 5/2014 Yang et al.
(Continued)

FOREIGN PATENT DOCUMENTS

WO 2013131264 9/2013

OTHER PUBLICATIONS

PCT International Application No. PCT/KR2017/005742, International Search Report dated Sep. 12, 2017, 4 pages.
(Continued)

*Primary Examiner* — Jutai Kao
(74) *Attorney, Agent, or Firm* — Lee, Hong, Degerman, Kang & Waimey PC

(57) ABSTRACT

Provided are a method and device for transmitting uplink data in a wireless communication. More specifically, a user equipment (UE) receives, from a first base station (BS), cell group information indicating that the first BS and a second BS are included in the same cell group. The UE receives, from the first BS, a first reference signal and assignment information regarding a first semi-persistent scheduling (SPS) resource. The UE transmits, to the second BS, a first uplink signal on the basis of the first SPS resource and the first reference signal.

15 Claims, 17 Drawing Sheets

(51) Int. Cl.
| | |
|---|---|
| *H04W 76/27* | (2018.01) |
| *H04W 56/00* | (2009.01) |
| *H04W 72/14* | (2009.01) |
| *H04W 76/11* | (2018.01) |
| *H04W 72/04* | (2009.01) |
| *H04W 72/12* | (2009.01) |
| *H04W 80/02* | (2009.01) |

(52) U.S. Cl.
CPC .......... *H04L 5/0048* (2013.01); *H04L 5/0092* (2013.01); *H04W 56/001* (2013.01); *H04W 72/042* (2013.01); *H04W 72/1268* (2013.01); *H04W 72/14* (2013.01); *H04W 76/11* (2018.02); *H04W 76/27* (2018.02); *H04L 5/0007* (2013.01); *H04W 80/02* (2013.01)

(56) References Cited

U.S. PATENT DOCUMENTS

| | | | |
|---|---|---|---|
| 2015/0085728 | A1 | 3/2015 | Majjigi et al. |
| 2015/0215926 | A1 | 7/2015 | Huang et al. |
| 2015/0237629 | A1* | 8/2015 | Cheng ............... H04W 72/0453 370/329 |
| 2015/0312935 | A1 | 10/2015 | Lohr et al. |
| 2015/0334669 | A1* | 11/2015 | Zhang ............... H04W 56/0005 370/336 |
| 2016/0135095 | A1* | 5/2016 | Wu .................. H04W 36/0061 370/328 |
| 2016/0192386 | A1* | 6/2016 | Kim .................. H04W 72/1268 370/329 |
| 2018/0317277 | A1* | 11/2018 | Kim .................. H04W 52/0216 |

OTHER PUBLICATIONS

European Patent Office Application Serial No. 17166952.6, Search Report dated Sep. 28, 2017, 9 pages.
CMCC, "SPS support in dual connectivity", 3GPP TSG RAN WG2 Meeting #85, R2-140127, Feb. 2014, 2 pages.
QUALCOMM, "Procedures for dual connectivity", 3GPP TSG RAN WG2 Meeting #84, R2-134002, Nov. 2013, 5 pages.

* cited by examiner

METHOD AND APPARATUS FOR TRANSMITTING UPLINK DATA IN WIRELESS COMMUNICATION SYSTEM

CROSS-REFERENCE TO RELATED APPLICATIONS

This application is the National Stage filing under 35 U.S.C. 371 of International Application No. PCT/KR2017/005742, filed on Jun. 1, 2017, which claims the benefit of U.S. Provisional Application No. 62/344,981, filed on Jun. 2, 2016, the contents of which are all hereby incorporated by reference herein in their entirety.

BACKGROUND OF THE INVENTION

Field of the Invention

The present specification relates to wireless communications, and more particularly, to a method of transmitting uplink data in a wireless communication system, and a device using the method.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a $3^{rd}$ generation partnership project (3GPP) long term evolution (LTE) system, a user equipment (UE) in an idle state must perform an RRC connection setup and a data connection setup before data transmission is performed. This means that both of a logical connection (RRC connection) between a base station (BS) and the UE and a logical connection (S1 connection/interface, EPS connection) between a mobility management entity (MME) and the UE are set up. Therefore, in order for the UE to perform data transmission, it takes an additional time corresponding to a time required to perform the connection setup. However, when the UE transmits or receives large-sized data once or twice, it is ineffective to perform the connection setup. Accordingly, a connectionless transmission method may be considered to solve this problem.

SUMMARY OF THE INVENTION

Technical Objects

The present specification provides a method and apparatus for transmitting uplink data in a wireless communication system.

Technical Solutions

The present specification proposes a method of transmitting uplink data on the basis of a connectionless transmission procedure in a wireless communication system.

First, a terminology is summarized. Connectionless transmission may correspond to data transmission from a user equipment (UE) to a base station (BS) in an idle state. The connection transmission may correspond to data transmission from the UE to the BS after a radio resource control (RRC) connection and a data connection are set up with the BS. The RRC connection is set up between the UE and a 1st BS.

First, the UE receives, from the 1st BS, cell group information indicating that the 1st BS and a 2nd BS are included in the same cell group. The cell group information is information indicating which cell is included in a corresponding cell group. Herein, the cell group information indicates that a cell supported by the 1st BS and a cell supported by the 2nd BS are included in the same cell group. That is, upon receiving the cell group information, the UE may know that the 1st BS and the 2nd BS are included in the same cell group.

The UE receives from the 1st BS a 1st reference signal and assignment information regarding a 1st semi-persistent scheduling (SPS) resource.

If the UE moves from the cell supported by the 1st BS to the cell supported by the 2nd BS, there may be a case where the UE must transmit an uplink signal to the 2nd BS. In this case, the UE transmits a 1st uplink signal to the 2nd BS on the basis of the 1st SPS resource and the 1st reference signal.

That is, the UE may transmit uplink signals to BSs in the same cell group by using the same SPS resource and reference signal for the same cell group. That is, the UE may receive from the 1st BS the 1st reference signal and assignment information regarding the 1st SPS resource before moving to the cell supported by the 2nd BS. If the UE moves to the cell supported by the 2nd BS, the 1st uplink signal may be transmitted to the 2nd BS by using the 1st reference signal and the assignment information regarding the 1st SPS resource received from the 1st BS.

Since the UE may transmit the 1st uplink signal to the 2nd BS by using the 1st SPS resource and reference signal pre-assigned from the 1st BS, the 1st uplink signal may be transmitted in a state where the RRC connection is not set up between the UE and the 2nd BS. Even if the 1st BS moves from the cell supported by the 1st BS to the cell supported by the 2nd BS, the UE may transmit the 1st uplink signal without having to perform a handover to the 2nd BS. That is, the UE maintains the RRC connection with the 1st BS.

In addition, the 1st uplink signal may be transmitted through the remaining resources other than a specific resource among the 1st SPS resources, and the specific resource may include a symbol or subcarrier in which an interference occurs due to an uplink synchronization mismatch. Since the UE transmits the 1st uplink signal in a state where the RRC connection is not set up with the 2nd BS (the UE does not perform the handover to the 2nd BS), uplink synchronization may be mismatched between the UE and another cell in a cell group. Therefore, some resources among the 1st SPS resources in which the interference occurs due to the uplink synchronization mismatch need to be unoccupied so as not to overlap with other signals. More specifically, foremost L1 symbols and rearmost L2 symbols may be excluded in the 1st SPS resource or uppermost L1 subcarriers and lowermost L2 subcarriers may be excluded in the 1st SPS resource. Herein, L1+L2 is an integer greater than or equal to 1, and L1 and L2 are integers greater than or equal to 0.

In addition, the 1st uplink signal may be transmitted after the UE performs a random access procedure with the 2nd BS to match the uplink synchronization. If the UE moves to a cell in a cell group of which a connection is not set up, the UE may match the uplink synchronization through the random access procedure. However, in the random access procedure, only a step of transmitting a random access preamble and receiving a random access response is performed, and subsequent steps corresponding to a connection setup process are not performed.

If the UE moves from the cell supported by the 1st BS to a cell supported by a 3rd BS, there may be case where the UE must transmit an uplink signal to the 3rd BS. The 3rd BS is not included in the same cell group including the 1st BS. In this case, the UE sets up an RRC connection with the 3rd BS, and thereafter receives a 2nd reference signal and assignment information regarding a 2nd SPS resource from the 3rd BS. In doing so, the UE releases the RRC connection with the 1st BS. The UE transmits a 2nd uplink signal to the 3rd BS on the basis of the 2nd SPS resource and the 2nd reference signal.

That is, since the UE transmits an uplink signal by using the same SPS resource and reference signal for each cell group, the 2nd reference signal and the assignment information regarding the 2nd SPS resource which are different from the 1st reference signal and the assignment information regarding the 1st SPS resource previously received from the 1st BS must be newly received from the 3rd BS belonging to a different cell group.

In other words, although the 1st SPS resource and reference signal may be pre-assigned from the 1st BS before the UE moves to the cell supported by the 3rd BS, the 1st reference signal and 1st SPS resource assigned from the 1st BS can be used only in a cell group to which the 1st BS belongs, and it does not mean that the 1st SPS resource and the 1st reference signal are also used in another cell group. Therefore, if the UE moves to the cell supported by the 3rd BS, the 2nd uplink signal may be transmitted to the 3rd BS by using the 2nd reference signal and the 2nd SPS resource newly assigned from the 3rd BS.

Since the UE must receive the 2nd reference signal and the assignment information regarding the 2nd SPS resource from the 3rd BS, the UE must set up an RRC connection with the 3rd BS. That is, the UE may transmit the 2nd uplink signal after performing a handover to the 3rd BS.

Before the UE sets up the RRC connection with the 3rd BS, the UE may transmit information regarding the cell supported by the 1st BS to the 3rd BS. This is an operation in which information of a cell in which the UE sets up a connection most recently (the cell supported by the 1st BS) is reported to a new cell (the cell supported by the 3rd BS) in order to rapidly set up a connection with the new cell.

In addition, after the UE sets up the RRC connection with the 3rd BS, the UE may receive information regarding a modulation scheme and coding rate from the 3rd BS.

In addition, the 1st reference signal and the assignment information regarding the 1st SPS resource may be received by using a temporary identifier for SPS. The temporary identifier for the SPS may correspond to an SPS-RNTI. The temporary identifier for the SPS may correspond to the 1st reference signal and 1st SPS resource transmitted by a plurality of cells included in the same cell group. That is, if the UE uses the temporary identifier for the SPS, the UE may receive information related to uplink scheduling from the 2nd BS of which the RRC connection is not set up. The temporary identifier for the SPS is valid in the cell group.

In addition, the 1st BS may deliver to the 2nd BS at least one of assignment information regarding the 1st SPS resource, the 1st reference signal, information regarding the modulation scheme and coding rate, a service requirement and service characteristic, routing information of a core network, the temporary identifier for the SPS, an encryption key applied to the 1st uplink signal, and a UE identifier.

In addition, there may be a case where, although the 2nd BS receives the 1st uplink signal through the 1st SPS resource from the UE, the 2nd BS desires to receive the 1st uplink signal by using another SPS resource or another reference signal or another modulation scheme and coding rate. In this case, the UE receives from the 2nd BS a paging signal including SPS resource change information. The UE transmits a 3rd uplink signal on the basis the SPS resource change information to the 2nd BS. The SPS resource change information is masked by the 2nd BS by using the temporary identifier for the SPS. The SPS resource change information may be received by using the temporary identifier for the SPS.

In addition, the present specification proposes an apparatus for transmitting uplink data on the basis of a connectionless transmission procedure in a wireless communication system.

First, a terminology is summarized. Connectionless transmission may correspond to data transmission from a UE to a BS in an idle state. The connection transmission may correspond to data transmission from the UE to the BS after an RRC connection and a data connection are set up with the BS. The RRC connection is set up between the UE and a 1st BS. The apparatus may be the UE.

The apparatus includes a radio frequency (RF) unit for transmitting and receiving a radio signal and a processor coupled to the RF unit. First, the processor receives, from the 1st BS, cell group information indicating that the 1st BS and a 2nd BS are included in the same cell group. The cell group information is information indicating which cell is included in a corresponding cell group. Herein, the cell group information indicates that a cell supported by the 1st BS and a cell supported by the 2nd BS are included in the same cell group. That is, upon receiving the cell group information, the UE may know that the 1st BS and the 2nd BS are included in the same cell group.

The processor receives from the 1st BS a 1st reference signal and assignment information regarding a 1st semi-persistent scheduling (SPS) resource.

If the UE moves from the cell supported by the 1st BS to the cell supported by the 2nd BS, there may be a case where the UE must transmit an uplink signal to the 2nd BS. In this case, the processor transmits a 1st uplink signal to the 2nd BS on the basis of the 1st SPS resource and the 1st reference signal.

That is, the UE may transmit uplink signals to BSs in the same cell group by using the same SPS resource and reference signal for the same cell group. That is, the UE may receive from the 1st BS the 1st reference signal and the assignment information regarding the 1st SPS resource before moving to the cell supported by the 2nd BS. If the UE moves to the cell supported by the 2nd BS, the 1st uplink signal may be transmitted to the 2nd BS by using the 1st reference signal and the assignment information regarding the 1st SPS resource received from the 1st BS.

Since the UE may transmit the 1st uplink signal to the 2nd BS by using the 1st SPS resource and reference signal pre-assigned from the 1st BS, the 1st uplink signal may be transmitted in a state where the RRC connection is not set up between the UE and the 2nd BS. Even if the 1st BS moves from the cell supported by the 1st BS to the cell supported by the 2nd BS, the UE may transmit the 1st uplink signal without having to perform a handover to the 2nd BS. That is, the UE maintains the RRC connection with the 1st BS.

In addition, the 1st uplink signal may be transmitted through the remaining resources other than a specific resource among the 1st SPS resources, and the specific resource may include a symbol or subcarrier in which an interference occurs due to an uplink synchronization mismatch. Since the UE transmits the 1st uplink signal in a state where the RRC connection is not set up with the 2nd BS (the UE does not perform the handover to the 2nd BS), uplink synchronization may be mismatched between the UE and another cell in a cell group. Therefore, some resources among the 1st SPS resources in which the interference occurs due to the uplink synchronization mismatch need to be unoccupied so as not to overlap with other signals. More specifically, foremost L1 symbols and rearmost L2 symbols may be excluded in the 1st SPS resource or uppermost L1 subcarriers and lowermost L2 subcarriers may be excluded in the 1st SPS resource. Herein, L1+L2 is an integer greater than or equal to 1, and L1 and L2 are integers greater than or equal to 0.

In addition, the 1st uplink signal may be transmitted after the UE performs a random access procedure with the 2nd BS to match the uplink synchronization. If the UE moves to a cell in a cell group of which a connection is not set up, the UE may match the uplink synchronization through the random access procedure. However, in the random access procedure, only a step of transmitting a random access preamble and receiving a random access response is performed, and subsequent steps corresponding to a connection setup process are not performed.

If the UE moves from the cell supported by the 1st BS to a cell supported by a 3rd BS, there may be case where the UE must transmit an uplink signal to the 3rd BS. The 3rd BS is not included in the same cell group including the 1st BS. In this case, the UE sets up an RRC connection with the 3rd BS, and thereafter receives a 2nd reference signal and assignment information regarding a 2nd SPS resource from the 3rd BS. In doing so, the UE releases the RRC connection with the 1st BS. The UE transmits a 2nd uplink signal to the 3rd BS on the basis of the 2nd SPS resource and the 2nd reference signal.

That is, since the UE transmits an uplink signal by using the same SPS resource and reference signal for each cell group, the 2nd reference signal and the assignment information regarding the 2nd SPS resource which are different from the 1st reference signal and the assignment information regarding the 1st SPS resource previously received from the 1st BS must be newly received from the 3rd BS belonging to a different cell group.

In other words, although the 1st SPS resource and reference signal may be pre-assigned from the 1st BS before the UE moves to the cell supported by the 3rd BS, the 1st reference signal and 1st SPS resource assigned from the 1st BS can be used only in a cell group to which the 1st BS belongs, and it does not mean that the 1st SPS resource and the 1st reference signal are also used in another cell group. Therefore, if the UE moves to the cell supported by the 3rd BS, the 2nd uplink signal may be transmitted to the 3rd BS by using the 2nd reference signal and 2nd SPS resource newly assigned from the 3rd BS.

Since the UE must receive the 2nd reference signal and the assignment information regarding the 2nd SPS resource from the 3rd BS, the UE must set up an RRC connection with the 3rd BS. That is, the UE may transmit the 2nd uplink signal after performing a handover to the 3rd BS.

Before the UE sets up the RRC connection with the 3rd BS, the UE may transmit information regarding the cell supported by the 1st BS to the 3rd BS. This is an operation in which information of a cell in which the UE sets up a connection most recently (the cell supported by the 1st BS) is reported to a new cell (the cell supported by the 3rd BS) in order to rapidly set up a connection with the new cell.

In addition, after the UE sets up the RRC connection with the 3rd BS, the UE may receive information regarding a modulation scheme and coding rate from the 3rd BS.

In addition, the 1st reference signal and the assignment information regarding the 1st SPS resource may be received by using a temporary identifier for SPS. The temporary identifier for the SPS may correspond to an SPS-RNTI. The temporary identifier for the SPS may correspond to the 1st reference signal and 1st SPS resource transmitted by a plurality of cells included in the same cell group. That is, if the UE uses the temporary identifier for the SPS, the UE may receive information related to uplink scheduling from the 2nd BS of which the RRC connection is not set up. The temporary identifier for the SPS is valid in the cell group.

In addition, the 1st BS may deliver to the 2nd BS at least one of assignment information regarding the 1st SPS resource, the 1st reference signal, information regarding the modulation scheme and coding rate, a service requirement and service characteristic, routing information of a core network, the temporary identifier for the SPS, an encryption key applied to the 1st uplink signal, and a UE identifier.

In addition, there may be a case where, although the 2nd BS receives the 1st uplink signal through the 1st SPS resource from the UE, the 2nd BS desires to receive the 1st uplink signal by using another SPS resource or another reference signal or another modulation scheme and coding rate. In this case, the UE receives from the 2nd BS a paging signal including SPS resource change information. The UE transmits a 3rd uplink signal on the basis the SPS resource change information to the 2nd BS. The SPS resource change information is masked by the 2nd BS by using the temporary identifier for the SPS. The SPS resource change information may be received by using the temporary identifier for the SPS.

Effects of the Invention

A handover overhead of a user equipment (UE) for periodically transmitting uplink data can be decreased by using the proposed method. Further, since the UE can transmit the uplink data by randomly selecting a cell having a good channel state, a transmission delay caused by a handover failure and a disconnection can be minimized.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
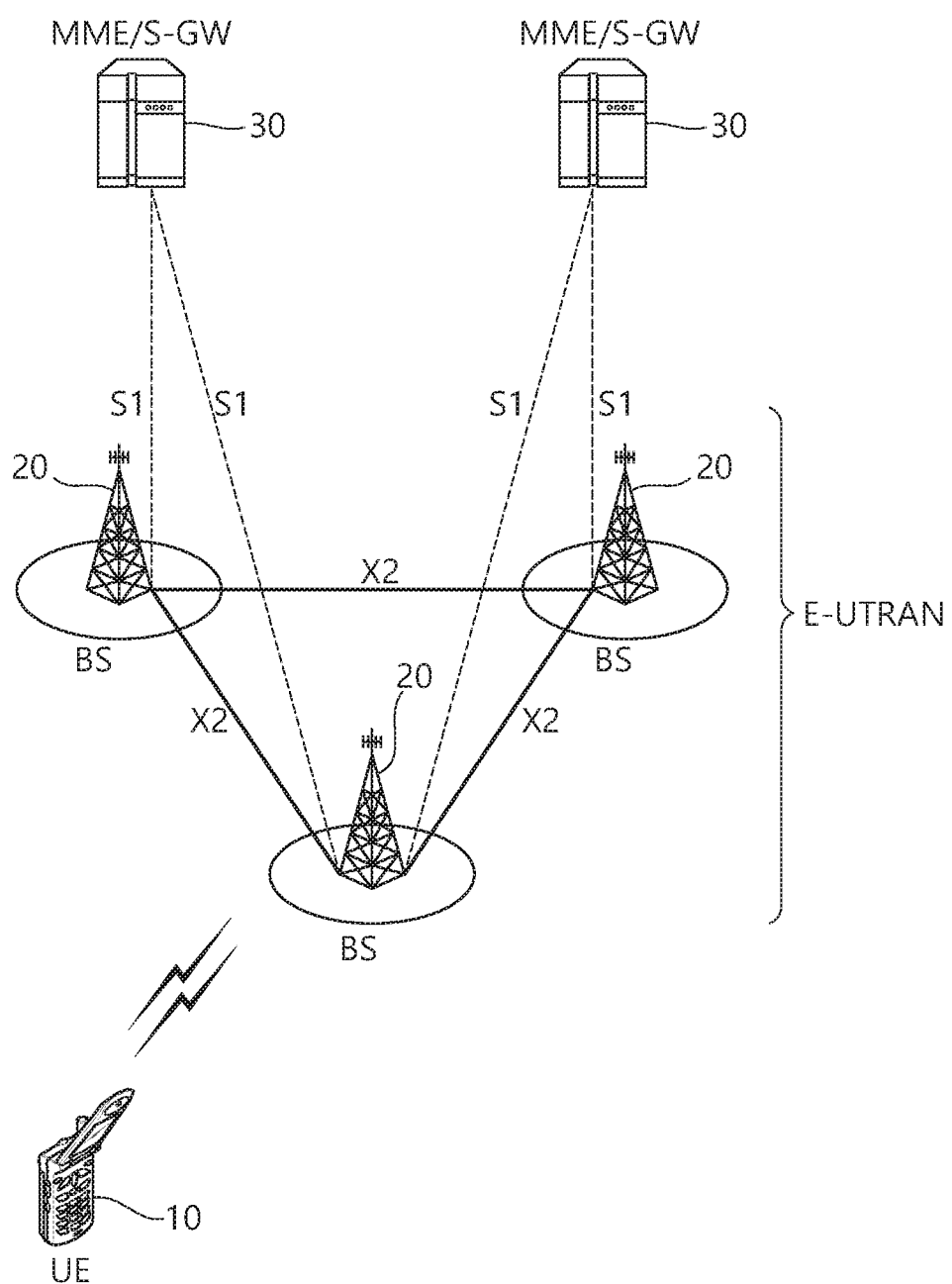
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
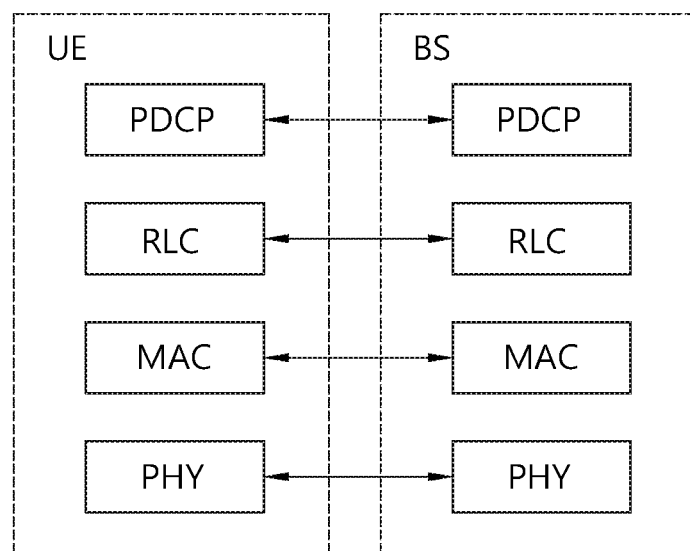
FIG. 2 is a diagram illustrating a radio protocol architecture for a user plane.
Figure 3:
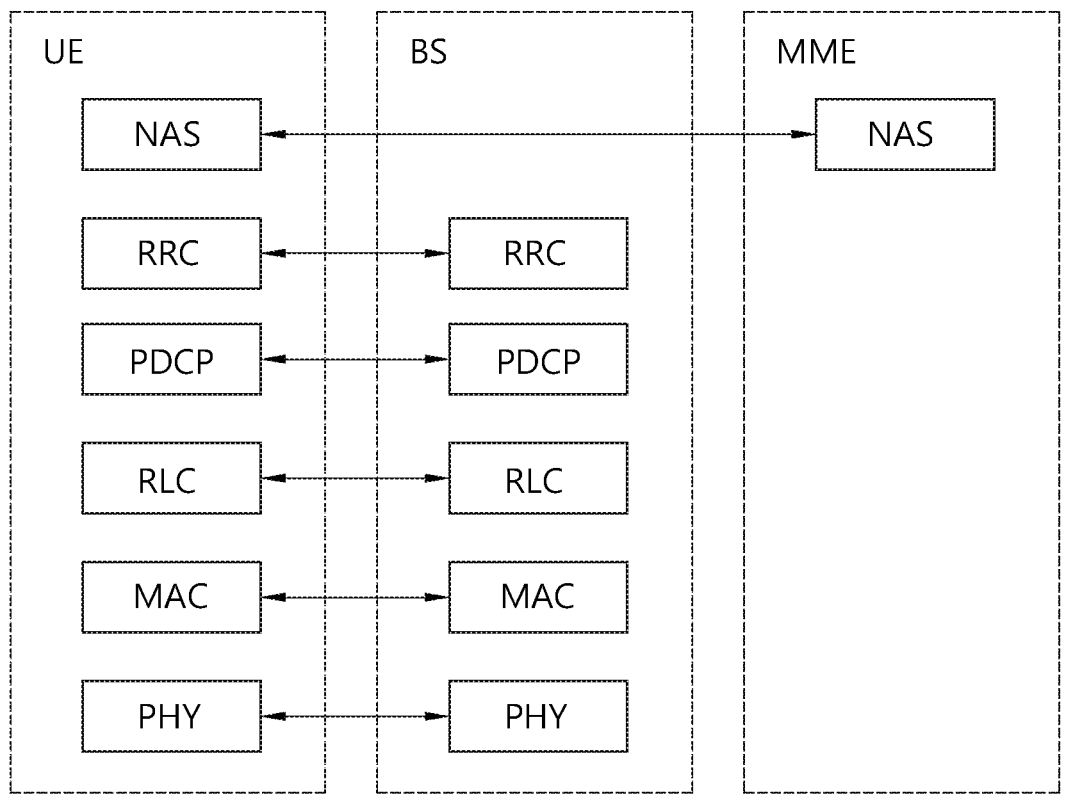
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
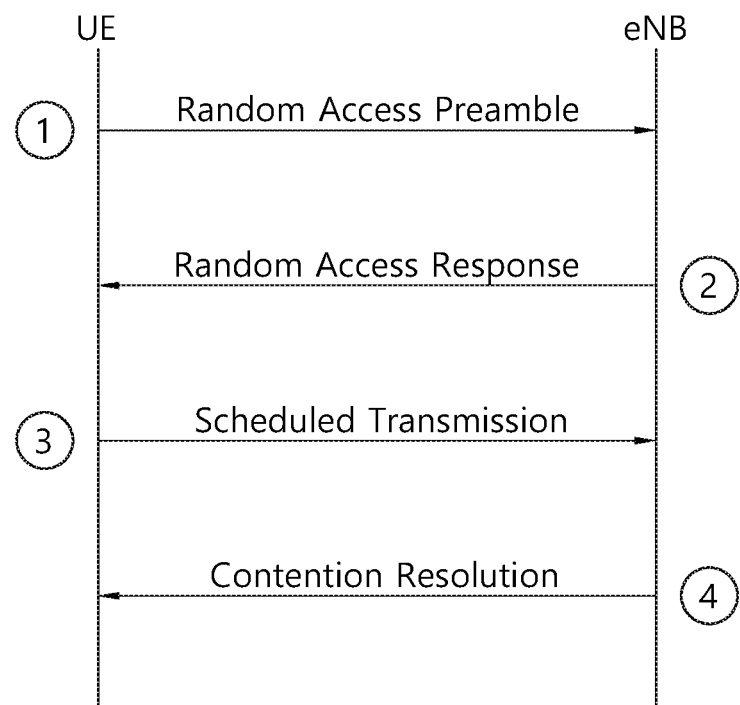
FIG. 4 shows a process of an operation performed between a user equipment (UE) and an eNodeB (eNB) in a contention-based random access procedure.

FIG. 4 shows a process of an operation performed between a UE and an eNB in a contention-based random access procedure.

First, in the contention-based random access, the UE may randomly select a random access preamble in a group of random access preambles indicated through system information or a handover command, may select a PRACH resource capable of transmitting the random access preamble, and may subsequently transmit the selected random access preamble to the eNB (step 1).

After transmitting the random access preamble, the UE may attempt to receive a response for the random access preamble in a random access response reception window indicated through the handover command (step 2). More particularly, the random access information may be transmitted in a form of a MAC PDU, and the MAC PDU may be transmitted on a physical downlink shared channel (PDSCH). Further, a physical downlink control channel (PDCCH) is transmitted so that the UE can properly receive information transmitted on the PDSCH. That is, the PDCCH includes information regarding a UE for receiving the PDSCH, frequency and time information of radio resources of the PDSCH, a transmission format of the PDSCH, or the like. Herein, if the PDCCH is successfully received, the UE may properly receive a random access response transmitted on the PDSCH according to information of the PDCCH. The random access response may include a random access preamble identifier (ID), an uplink (UL) grant, a temporary C-RNTI, a time alignment command (TAC), or the like. Herein, the random access preamble ID is included in the random access response. This is to inform the UE about which information is information regarding a UL grant, a temporary C-RNTI, a time alignment command among valid (available) information. As such, the random access preamble ID is necessary since one random access response may include random access information for one or more UEs. Herein, the random access preamble ID may be the same as a random access preamble selected by the UE in the step 1.

When the UE receives a random access response which is valid for the UE, the UE may process information included in the random access response. That is, the UE stores the temporary C-RNTI. In addition, the UE uses a UL grant to transmit data stored in a buffer of the UE to the eNB or to transmit newly generated data to the eNB (step 3). Herein, a UE identifier must be necessarily included in data included in the UL grant (message 3). The reason above is that, in the contention-based random access procedure, the eNB cannot determine which UEs perform the random access procedure, and the UEs must be identified for contention resolution at a later time. Herein, in order to include the UE identifier, two different methods may be provided. A first method is for transmitting a cell identifier of the UE through a UL grant as to whether the UE has already received a valid cell identifier assigned in a corresponding cell before the random access procedure. On the contrary, a second method is for transmitting a unique ID of the UE if the UE does not receive the valid cell ID before the random access procedure. In general, the unique identifier of the UE is longer than the cell identifier. If the UE has already transmitted data through the UL grant in step 3, the UE starts a contention resolution timer.

After data is transmitted together with an identifier through the UL grant included in the random access response, the UE waits for an indication or instruction of an eNB for the contention resolution. That is, the UE attempts a reception of a PDCCH to receive a specific message (step 4). Herein, two methods are present to receive the PDCCH. As described above, if the UE identifier transmitted through the UL grant is a cell identifier, the UE attempts a reception of the PDCCH by using a cell identifier of the UE. If the UE identifier transmitted through the UL grant is a unique identifier of the UE, the UE attempts a reception of the PDCCH by using a temporary C-RNTI included in the random access response. Thereafter, in the former case, if the PDCCH (message 4) is received through the cell identifier before the contention resolution timer expires, the UE determines that the random access procedure is successfully performed, and finishes the random access procedure. In the latter case, if the PDCCH is received through the temporary cell identifier before the contention resolution timer expires, the UE checks data (message 4) transmitted by a PDSCH indicated by the PDCCH. If the unique identifier of the UE is included in the data, the UE determines that the random access procedure is successfully performed, and finishes the random access procedure.

Hereinafter, semi-persistent scheduling (SPS) is described.

In a next-generation communication system, the SPS is required for a plurality of UEs. An Internet of Things (IoT) service of various industries is expected to be introduced in the next-generation communication system. Representative examples thereof include an automobile, a drone, or the like. In these services, location information is expected to be updated in unit of 100 millisecond (ms) to 1 second (s) to manage autonomous driving and to prevent accidents. When the location information is updated periodically, the SPS is applied in general to decrease an overhead of an unnecessary control channel.

Figure 5:
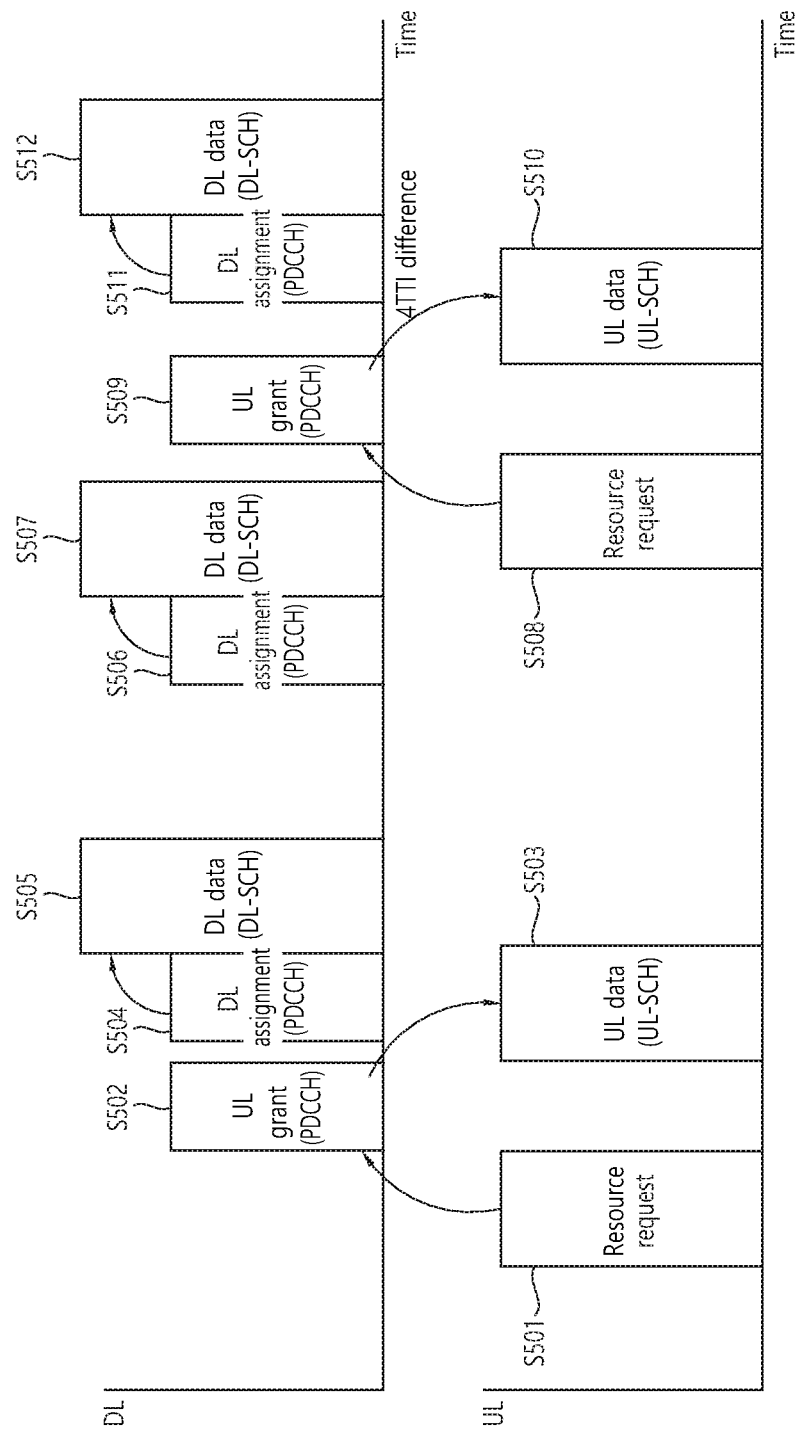
FIG. 5 is a drawing for explaining a method of dynamically assigning a radio resource.
Figure 6:
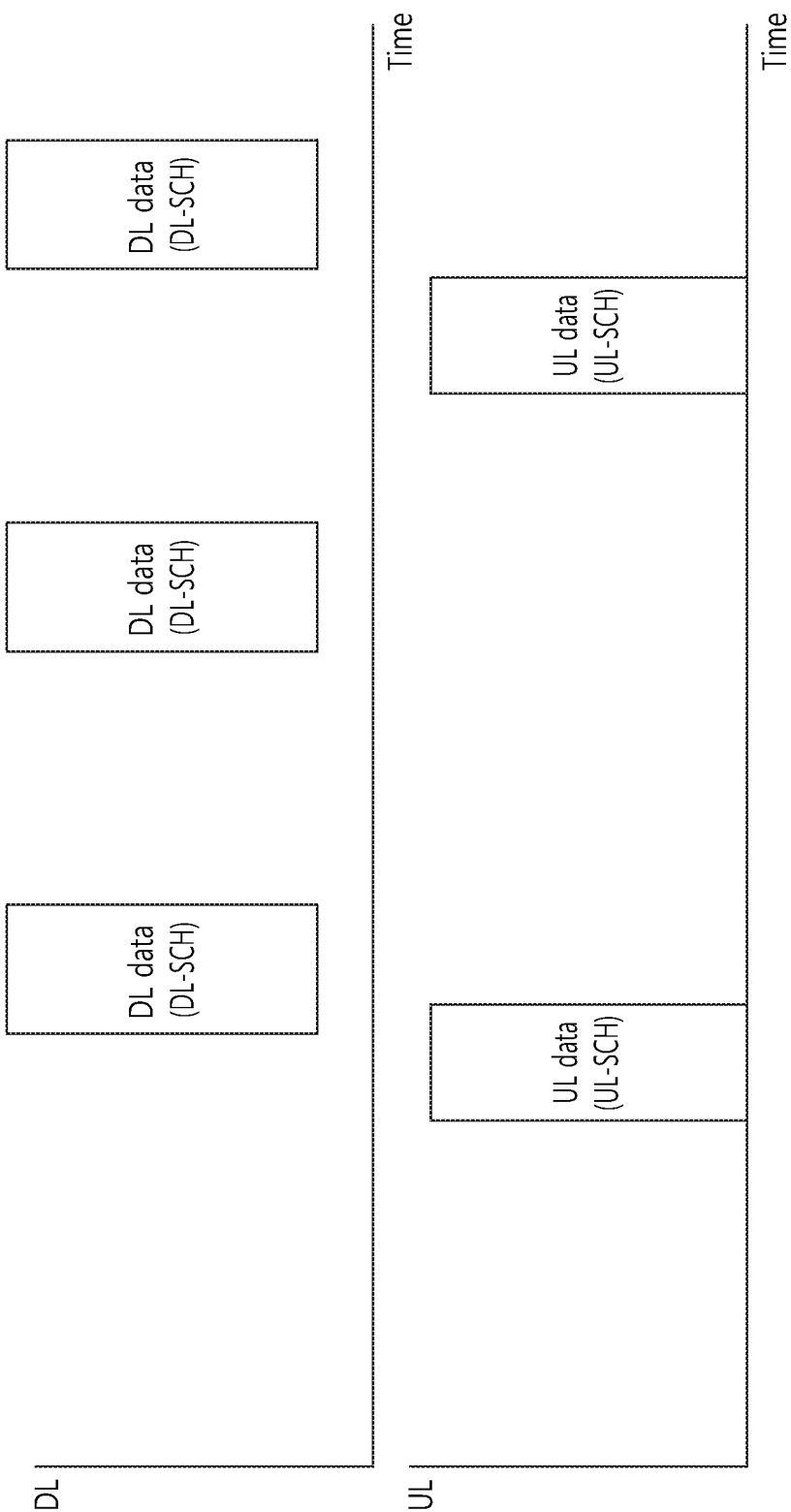
FIG. 6 is a drawing for explaining a semi-persistent scheduling (SPS) method.

FIG. 5 is a drawing for explaining a method of dynamically assigning a radio resource. FIG. 6 is a drawing for explaining an SPS method.

A typical process of transmitting data from a UE to an eNB (a method of dynamically assigning a radio resource) is described below with reference to FIG. 5. First, the UE may request the eNB to provide a radio resource required for transmission of generated data (S501). Therefore, the eNB may assign the radio resource through a control signal according to a radio resource request of the UE (S502). In an LTE system, the resource assignment of the eNB for transmitting UL data of the UE may be transmitted through a UL grant transmitted through a PDCCH. Therefore, the UE may transmit data to the eNB through the assigned radio resource (S503). The radio resource request of the UE, the resource assignment of the eNB, and corresponding UL data transmission of the UE may be optionally repeated (S508 to S510).

Meanwhile, when the eNB transmits downlink (DL) data to the UE, a DL assignment message may be transmitted to the UE through the PDCCH to know through which radio resource the data transmitted to the UE is transmitted (S504), and the eNB may transmit data to the UE through a radio resource corresponding to the DL assignment message (S505). In this case, DL assignment information transmission and DL data transmission through a radio resource corresponding thereto may be achieved in the same transmission time interval (TTI). Further, as shown in FIG. 5, the DL data transmission procedure may be repeated.

A method of assigning an SPS radio resource is a method in which first and second steps are skipped in three steps for transmitting data to the eNB (i.e., (1) the resource request of the UE, (2) the resource assignment of the eNB, and (3) the data transmission of the UE according to the resource assignment). Accordingly, the UE may perform a process of transmitting data directly without the aforementioned first and second steps, i.e., the step of requesting the radio resource and the step of assigning the radio resource, on the basis of a configuration of the radio resource. The concept of the SPS method is shown in FIG. 6. That is, in the SPS method, the eNB does not have to transmit radio resource assignment information all the time through the PDCCH.

Figure 7:
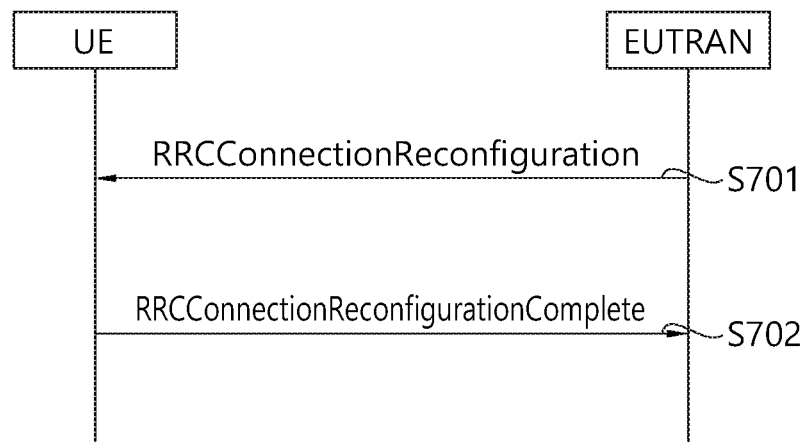
FIG. 7 is a drawing showing an RRC signaling flow between a UE and an eNB for an SPS configuration.
Figure 8:
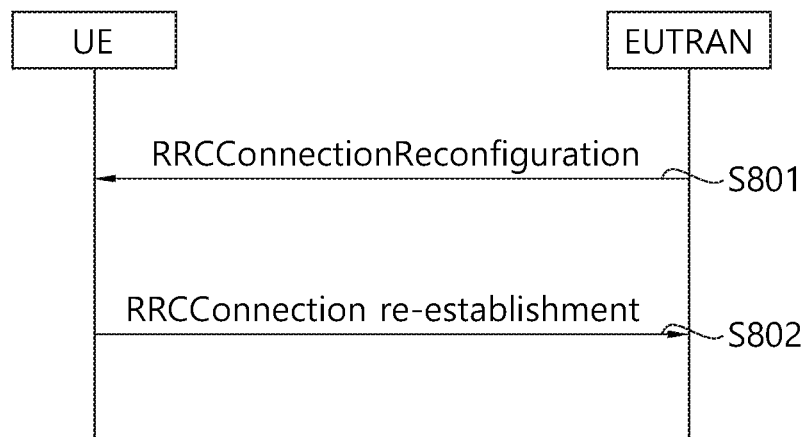
FIG. 8 is a drawing showing an RRC signaling flow between a UE and an eNB for an SPS configuration.

FIG. 7 and FIG. 8 are drawing showing an RRC signaling flow between a UE and an eNB for an SPS configuration.

More specifically, FIG. 7 is a drawing showing a case where a radio resource control (RRC) connection is successfully set up between the eNB and the UE, and FIG. 8 is a drawing showing a case where an RRC connection is not successfully set up between the eNB and the UE.

First, the eNB may transmit an RRC connection reconfiguration message to the UE through RRC signaling (S701, S801). The RRC connection reconfiguration message may include a radio resource configuration information element (IE), more specifically, radioResourceConfigDedicated, and the radio resource configuration IE may include an SPS configuration IE (sps-Config IE). The SPS configuration ID may include basic information regarding the SPS configuration such as a radio resource assignment period or the like for the SPS. Upon receiving the information, if the UE successfully sets up the RRC connection, an RRC connection reconfiguration complete message may be transmitted to the eNB (S702). Unlike this, if the RRC connection is not successfully set up, a configuration between the eNB and the UE may be adjusted by exchanging the RRC connection re-establishment message (S802).

Hereinafter, connectionless transmission will be described.

In a 3GPP LTE system, a UE in an idle state must perform an RRC connection setup and a data connection setup before data transmission is performed. This means that both of a logical connection (RRC connection) between an eNB and the UE and a logical connection (S1 connection/interface, EPS connection) between a mobility management entity (MME) and the UE are set up.

Figure 9:
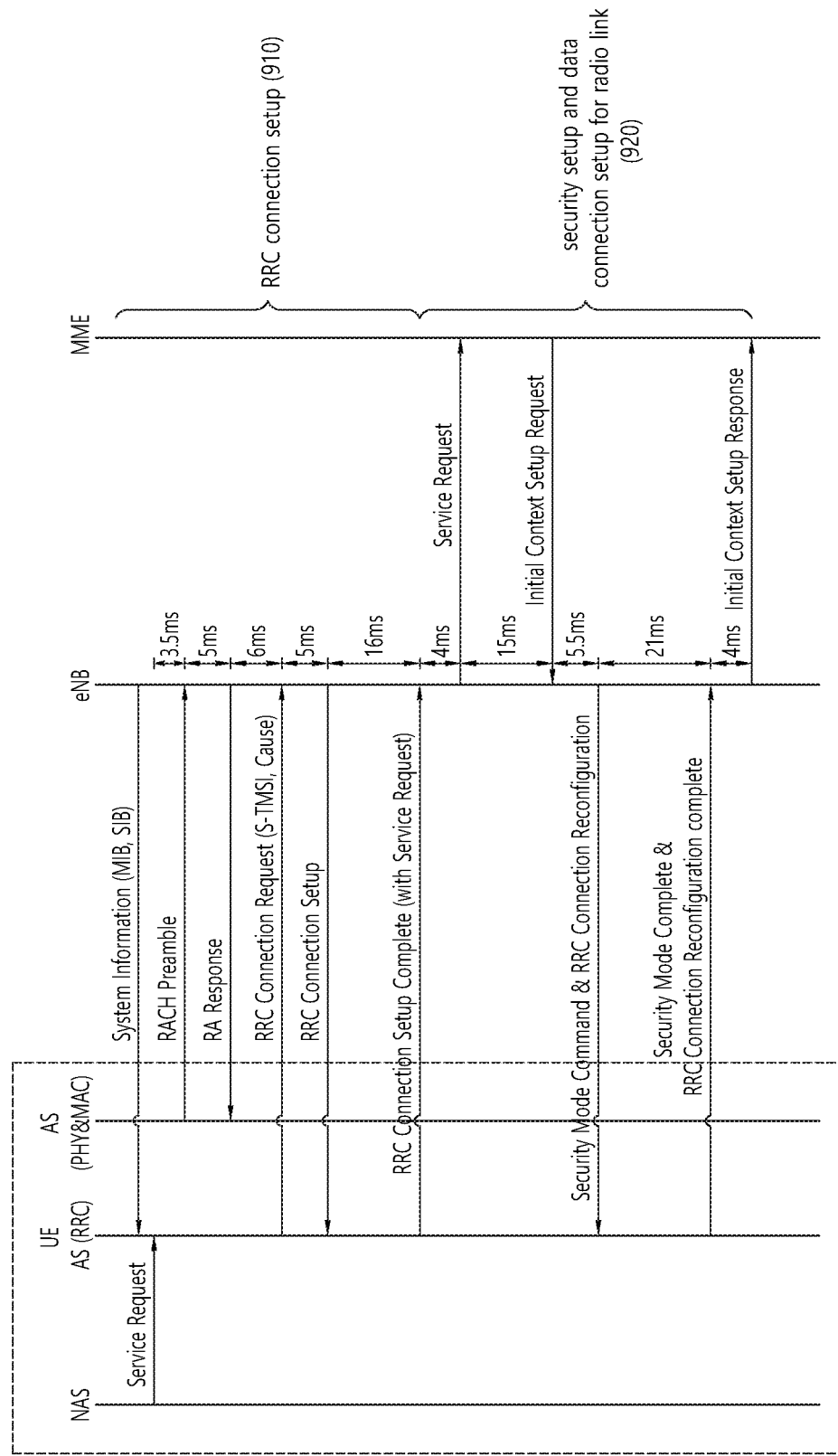
FIG. 9 shows a connection setup procedure and a required time in 3rd generation partnership project (3GPP) long term evolution (LTE).

FIG. 9 shows a connection setup procedure and a required time in 3GPP LTE.

Referring to FIG. 9, a UE first performs an RRC connection setup (see 910) with an eNB before transmitting data. The UE receives system information such as a master information block (MIB) and a system information block (SIB) from the eNB. In addition, the UE transmits a random access preamble through an RACH resource, and receives a random access response in response thereto. Thereafter, the UE transmits an RRC connection request to the eNB, and receives an RRC connection setup message from the eNB. When the UE transmits an RRC connection setup complete message to the eNB, the RRC connection setup (see 910) may be performed.

When the RRC connection setup (see 910) is performed with respect to the eNB, the UE performs a security setup and data connection setup for a radio link (see 920) with respect to a mobility management entity (MME). The eNB transmits a service request to the MME, and the MME transmits an initial context setup request to the eNB. The eNB transmits security mode command and RRC connection reconfiguration messages to the UE. The UE transmits security mode complete and RRC connection reconfiguration complete messages to the eNB. Thereafter, the eNB transmits an initial context setup request to the MME. In doing so, the UE may perform the security setup and data connection setup for the radio link (see 920) with respect to the MME.

Since it takes 35.5 ms in total for the RRC connection setup (see 910) and it takes 49.5 ms in total for the security setup and data connection setup for the radio link (see 920), it takes 85 ms in total as a time for transitioning a connected state of the UE in the idle state.

If it is intended to transmit UL data after transitioning the connected state of the UE, the UE must undergo a step of transmitting a scheduling request to the eNB. A procedure of transmitting the UL data and a delay caused thereby are described below with reference to FIG. 10 and FIG. 11.

Figure 10:
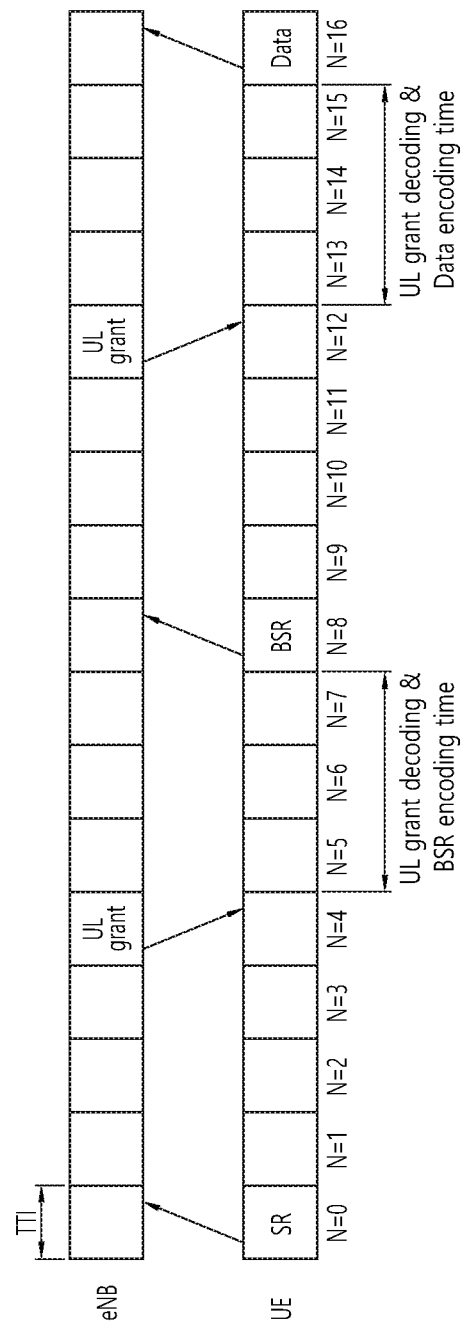
FIG. 10 shows a required time in a method of assigning an uplink resource through a scheduling request in 3GPP LTE.

FIG. 10 shows a required time in a method of assigning a UL resource through a scheduling request in 3GPP LTE.

Referring to FIG. 10, a UE transmits a scheduling request (SR) to an eNB, and the eNB transmits a UL grant to the UE. The UE decodes the UL grant during a specific duration, and encodes a buffer status report (BSR). Thereafter, the UE transmits the encoded BSR to the eNB, the eNB transmits the UL grant to the UE, and the UE transmits data to the eNB according to the UL grant. The method of assigning the UL resource through the SR may generate a delay of 9.5 ms in total.

Figure 11:
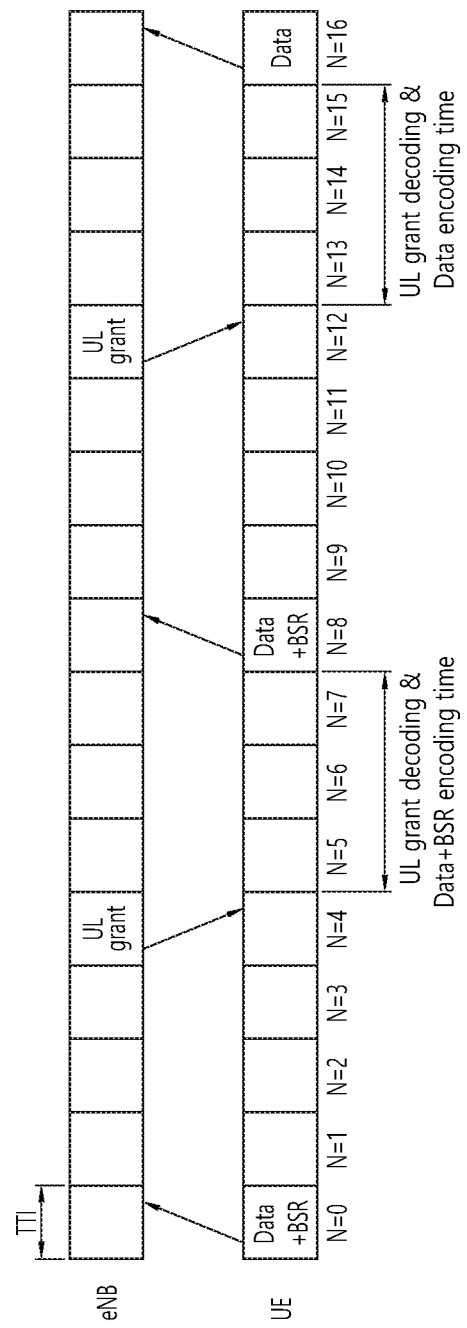
FIG. 11 shows a required time in a method of assigning an uplink resource through a scheduling request (SR) and a buffer status report (BSR) in 3GPP LTE.

FIG. 11 shows a required time in a method of assigning a UL resource through a scheduling request (SR) and a buffer status report (BSR) in 3GPP LTE.

Referring to FIG. 11, a UE transmits data and a BSR to an eNB, and the BS transmits a UL grant to the UE. The UE decodes the UL grant during a specific duration, and encodes the data and the BSR. Thereafter, the UE transmits the encoded data and BSR to the eNB, the eNB transmits the UL grant to the UE, and the UE transmits data to the eNB according to the UL grant. The method of assigning the UL resource through the SR and the BSR of the UE may generate a delay of 17.5 ms in total.

That is, it may take 9.5 ms to 17.5 ms in total as a time of occupying a radio resource and transmitting data by a UE which has transitioned to a connected state. Since it takes 85 ms in total as a time required for the UE in the idle state to transition to the connected state, it may take 94 ms to 102.5 ms in total as a time required for the UE in the idle state to transmit data. Accordingly, a connectionless transmission method may be considered to decrease a delay time depending on the transitioning of the connected state of the UE.

In general, when there is no data to be transmitted, the UE transitions to a discontinuous reception mode or an idle state to achieve power saving or to decrease a network overhead. In the discontinuous reception mode in which a connection set up with the eNB is maintained, a handover is performed when the UE moves between the eNBs. However, in a situation where too many UEs are connected to a single eNB and all UEs are moving UEs, there is a disadvantage in that a signaling overhead is increased in a radio duration for performing the handover. Further, there is a disadvantage in that the UE has to perform the handover frequently when a communication eNB having a small coverage such as a road side unit is installed. Therefore, the connectionless transmission method may be used to decrease the signaling overhead in the radio duration caused by the handover.

However, the connectionless transmission using the random access procedure has the following disadvantages. If the UE periodically transmits a signal, unnecessary signaling may be generated when a random access is performed all the time. Further, if the connectionless transmission is performed by using the random access procedure, there may also be a risk in which a preamble or a transmission signal collides.

The present specification proposes a method of allowing a UE to reliably transmit UL data while minimizing a handover of a moving UE, by configuring a semi-persistent scheduling (SPS) resource in a multi-cell (or eNB). Although a method of using a cell is described herein, the present specification is not limited only to the cell and thus may also be applied to similar scenarios. For example, the cell in the present specification may be replaced with a transmission point (TP), an access point (AP), a radio unit, or the like.

Hereinafter, a method of assigning an SPS resource for connectionless UL transmission in a multi-cell is described.

An eNB performs semi-persistent scheduling (SPS) on a reference signal and a resource for UL data transmission to a UE through L2/L3 signaling. At the same time, information regarding a cell (or eNB) group to which an SPS resource for the UL data transmission is applied is delivered to the UE. Upon receiving this, the UE transmits a UL signal by using the same SPS resource and reference signal in a corresponding cell group.

The UE receives cell group information consisting of an identifier of a cell (e.g., a cell ID) from an eNB of which a connection is set up. Thereafter, when the UE moves to cells in the cell group, the UL signal is transmitted by using a pre-assigned SPS resource and reference signal without having to perform a handover. Since the UE does not perform a handover with respect to a new cell to which the UE moves from a previous cell, a connection with the new cell is not set up with the UE.

For example, if the UE detects a cell not included in a cell group and intends to transmit UL data to the cell, a connection is set up with the cell. After the connection is set up, as described above, the eNB transmits assignment information, reference signal, and/or cell group information regarding an SPS resource to the UE. Upon receiving this, if the UE moves to the cell in the cell group, the UL signal is transmitted by using a pre-assigned SPS resource and reference signal, without having to perform a handover again.

If the UE moves to a cell not belonging to the cell group, the SPS resource and the reference signal need to be newly assigned. Therefore, the UE must set up a connection with the cell not belonging to the cell group and newly receive necessary information.

Further, in order to rapidly set up a connection with a new cell (the cell not belonging to the cell group), the UE reports, to the new cell, information of a cell of which a connection is set up most recently. Upon receiving this, the new cell requests the cell, of which the connection is set up most recently, to provide necessary information, and thereafter receive a reference signal and assignment information regarding a new SPS resource.

Further, if a direct interface (e.g., X2 interface) is configured between a new cell and a previous cell, the new cell and the previous cell exchange information directly to each other. However, if the direct interface is not configured between the new cell and the previous cell, the information may be exchanged by using a device (e.g., MME) for performing mobility management.

Further, the cell of which the connection is newly set up (the cell not belonging to the cell group) also transmits information regarding a modulation scheme and coding rate to the UE in addition to the information regarding the reference signal and the assignment information regarding the new SPS resource.

Since a channel characteristic between the cell and the UE is different in case of the cell of which the connection is newly set up (the cell not belonging to the cell group), the modulation scheme and the coding rate need to be newly configured by considering this. However, since a handover is not performed in the cell group, the modulation scheme and the coding rate need to be configured in a robust manner by considering this.

For another example, if the UE moves to a different cell in a cell group of which a connection is not set up, UL synchronization may be mismatched between the different cell in the cell group and the UE. In order to cancel an interference on an adjacent symbol and an adjacent subcarrier due to the UL synchronization mismatch, some resources among SPS resource blocks are unoccupied.

Figure 12:
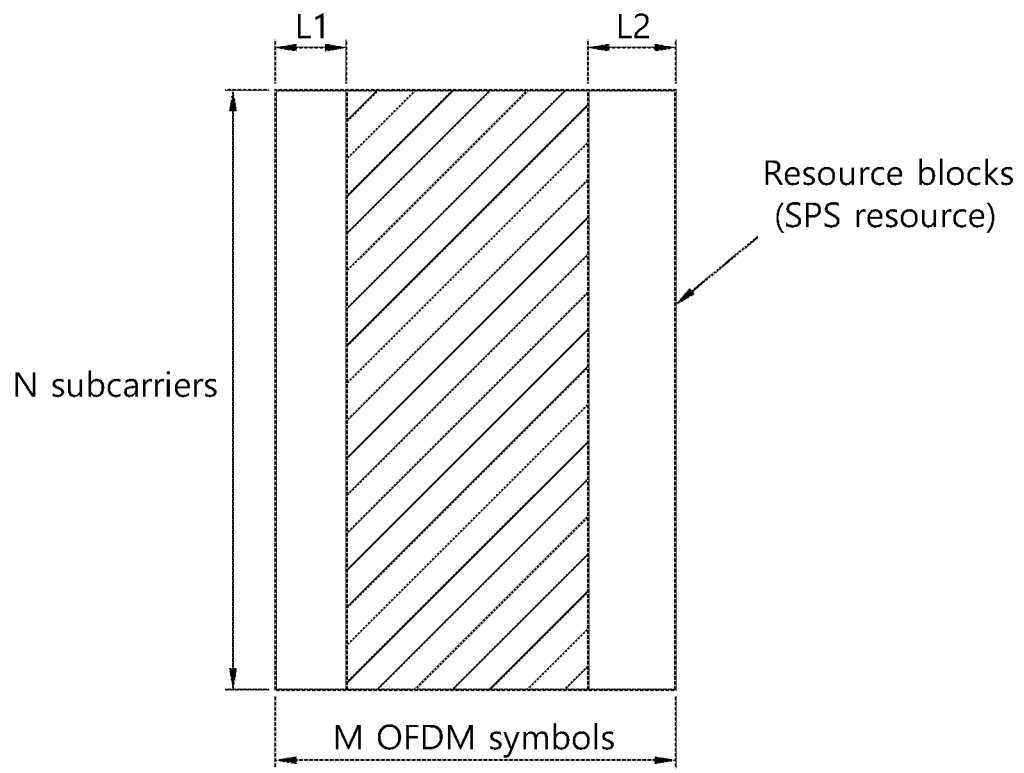
FIG. 12 illustrates an example of leaving unoccupied some resource elements to solve the UL synchronization mismatch.

FIG. 12 illustrates an example of leaving unoccupied some resource elements to solve the UL synchronization mismatch.

Referring to FIG. 12, among resource blocks assigned to the UE, foremost L1 symbols and rearmost L2 symbols are unoccupied. Herein, L1+L2 is an integer greater than or equal to 1, and L1 and L2 are integers greater than or equal to 0. If a road side unit (RSU) has a small coverage, this can be ignored since a mismatch of UL time synchronization is less than a cyclic prefix (CP) duration. However, if the UL synchronization mismatch is longer than the CP, some resources need to be unoccupied so as not to overlap with previous and next signals.

Figure 13:
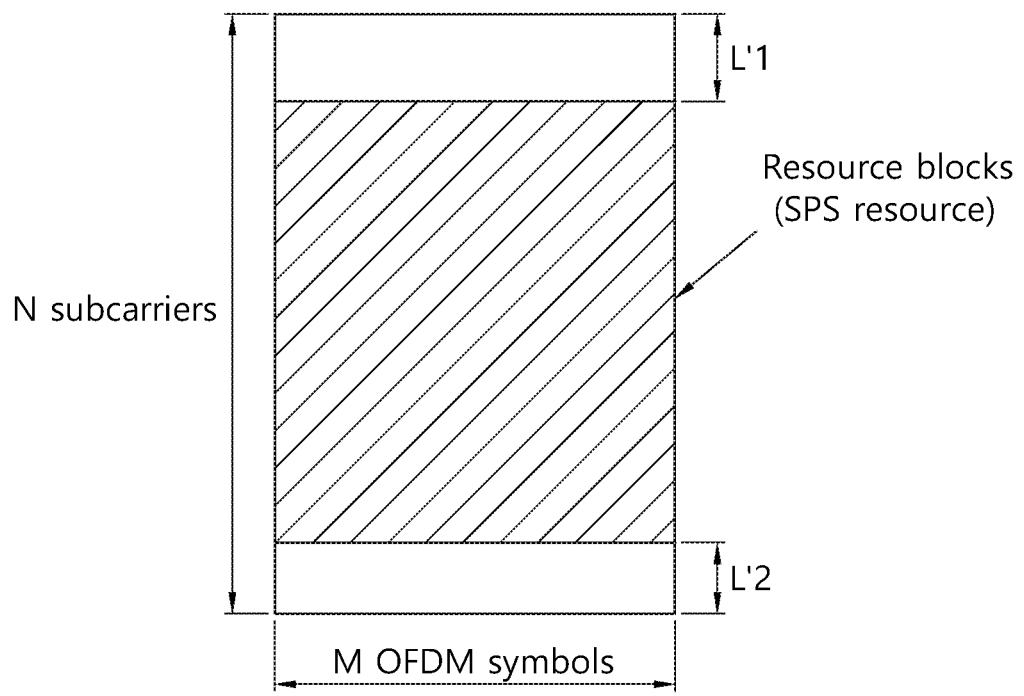
FIG. 13 illustrates another example of leaving unoccupied some resource elements to solve the UL synchronization mismatch.

FIG. 13 illustrates another example of leaving unoccupied some resource elements to solve the UL synchronization mismatch.

Referring to FIG. 13, among resources assigned to the UE, uppermost L'1 subcarrier resources and lowermost L'2 subcarrier resources are unoccupied. Herein, L'1 and L'2 are integers greater than or equal to 1. Due to the UL synchronization mismatch, a signal transmitted by the UE may generate out-of-band emission in upper and lower signals. In order to decrease an influence of the above case, a signal is not transmitted but is unoccupied in an upper subcarrier and a lower subcarrier.

Further, the present specification proposes a method of matching UL synchronization in a case where the UE moves to a different cell in a cell group of which a connection is not set up. If the UE moves to the cell in the cell group of which the connection is not set up, the UE matches UL synchronization through a random access procedure. However, only the steps 1 and 2 of FIG. 4 for transmitting the random access preamble and receiving the random access response are performed, and the subsequent steps, i.e., steps 3 and 4, are not performed. That is, if the UE does not perform synchronization with a cell in the cell group, resources are wasted similarly to a case where some resources are unoccupied. To solve this problem, a scenario may be considered in which, when the UE moves to a different cell in a cell group while tracking synchronization of an adjacent cell in advance, UL data is transmitted by matching synchronization with the different cell in the cell group.

Further, since the UE does not perform a handover with respect to the cell in the cell group, a cell for transmitting a UL signal is selected after measuring reception signal quality (e.g., signal to interference plus noise ratio (SINR), reference signal received power (RSRP), reference signal received quality (RSRQ)) of a cell adjacent to the UE. In addition, the UE transmits the UL signal by matching UL synchronization with the selected cell.

For another example, the UE has a temporary identifier (e.g., SPS-RNTI) for SPS applied to the cell group. The temporary identifier is required in order for the UE to receive necessary information from a cell of which a connection is set up. Further, if the temporary identifier is also used in the cell group, it is possible to receive information related to UL scheduling from a cell of which the connection is not set up.

Further, the UE is newly assigned the temporary identifier for the SPS from a most recently connected cell. Furthermore, the most recently connected cell delivers the temporary identifier for the SPS to cells in the group.

Further, the UE and the cell share in advance a rule of mapping the temporary identifier by using an SPS resource and a reference signal. After the UE is newly assigned the SPS resource and the reference signal from the cell, the temporary identifier is inferred by using the mapping rule. If the UL SPS resource or reference signal assigned to the UE is changed, the temporary identifier for the SPS is also changed according to the mapping rule.

In a connection setup procedure, the UE may be assigned a random access identifier (e.g., RA-RNTI) or may be assigned an SPS resource by using a temporary identifier (e.g., C-RNTI) used in dynamic scheduling. However, the random access identifier or the temporary identifier used in dynamic scheduling is valid only in a cell of which a connection is set up, whereas the temporary identifier for the SPS is valid only in the cell group.

For another example, a cell of which a connection is set up with the UE delivers to cells in the group an SPS resource assigned to the UE, reference signal information used in UL transmission, a modulation scheme and coding rate, a service requirement (e.g., quality of service (QoS)) and a service characteristic, routing information of a core network, or the like. Further, the cell of which the connection is set up with the UE also delivers the aforementioned temporary identifier for the SPS to cells in the group. Furthermore, the cell of which the connection is set up with the UE may deliver a UE identifier (e.g., UE ID, SIM number) or an encryption key applied to UL data to the cells in the group.

Further, it is assumed a case where the eNB receives a signal from the SPS resource but desires to receive the signal by using a different UL resource or a different reference signal or a different modulation scheme and coding rate. In this case, the eNB delivers to the UE a paging signal including change information. The change information is masked by using a temporary identifier for SPS provided to the UE, and the UE receives a signal by using the temporary identifier for the assigned SPS. This may be applied to a case where the eNB is no longer able to receive a signal from the SPS resource or a channel characteristic of the SPS resource is poor or a collision occurs in the SPS resource.

Further, the UE transmits UL data by using the change information only in a cell in which the signal is received. That is, SPS resource change information received from a cell in a disconnected state is valid only in the cell. Such a method has an advantage in that information exchange between cells is minimized. Also, there is an advantage in that scheduling is optimized by allowing cells in the group not to frequently change the information regarding the SPS resource.

Further, a cell which changes the information according to the change information reports the changed information to the cells in the cell group. Upon receiving this, the cells in the cell group receive information of the UE by using the changed information. In particular, when this method is applied to a case where cells are different but have the same physical location and thus have a similar channel characteristic, there is an effect of decreasing the number of times of transmitting the change information.

For another example, a cell in which a UL signal is received from the SPS resource delivers information regarding an activation time of the SPS resource to an adjacent cell. In case of an automobile running on a road and a drone moving along a course, it is possible for the eNB to predict a path along which the UE moves. Therefore, a time at which the UE moves may be reported to a cell to which the UE is expected to move. Upon receiving information regarding the activation time, an adjacent cell may utilize the SPS resource for a different usage until the UE is expected to move. Alternatively, until the information regarding the activation time is received, the cells in the cell group may deactivate the SPS resource and may utilize it for a different usage.

Figure 14:
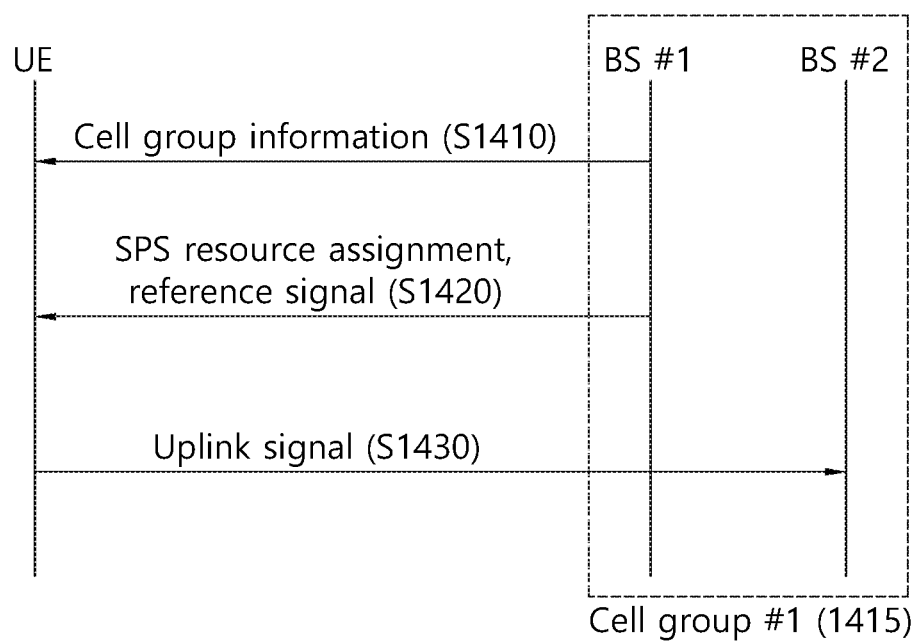
FIG. 14 is a drawing showing a procedure of transmitting uplink data on the basis of connectionless transmission in a multi-cell according to an embodiment of the present specification.
Figure 15:
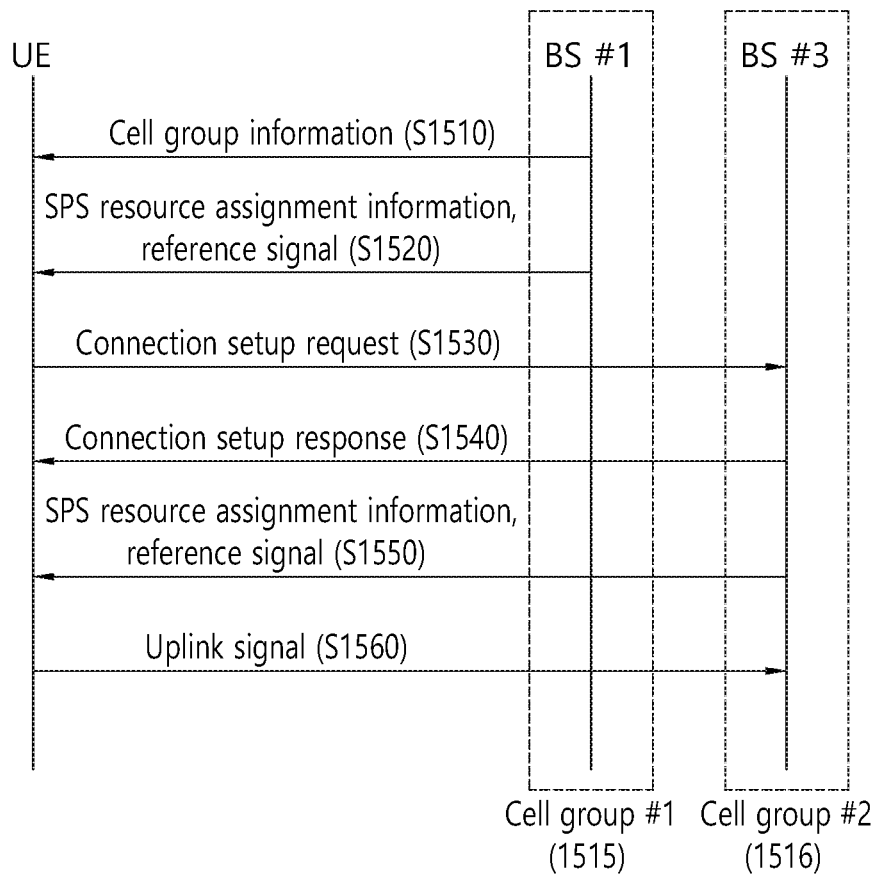
FIG. 15 is a drawing showing a procedure of transmitting uplink data on the basis of connectionless transmission in a multi-cell according to an embodiment of the present specification.

To facilitate the understanding for the aforementioned embodiment, a method of assigning an SPS resource for connectionless uplink transmission in a multi-cell is shown in FIG. 14 and FIG. 15.

FIG. 14 and FIG. 15 are drawings showing a procedure of transmitting uplink data on the basis of connectionless transmission in a multi-cell according to an embodiment of the present specification.

Referring to FIG. 14, steps S1410, S1420, and S1430 show a case where a UE transmits an uplink signal by moving to a cell included in a group cell. Referring to FIG. 15, steps S1510, S1520, and S1530 show a case where the UE transmits the uplink signal by moving to a cell not included in the cell group.

First, a case where the UE transmits the uplink signal by moving to the cell included in the cell group is described with reference to FIG. 14.

The UE receives cell group information from a BS #1 of which a connection is set up (S1410). The cell group information is information indicating which cell is included in the cell group, and in this case, may correspond to information regarding a cell group #1 1415. Upon receiving the cell group information in step S1410, the UE may know that the BS #1 and a BS #2 are included in the same cell group. That is, a cell supported by the BS #1 and a cell supported by the cell #2 are included in the cell group #1 1415.

The UE receives from the BS #1 a reference signal and assignment information regarding an SPS resource (S1420). If the UE moves from the cell supported by the BS #1 to the cell supported by the BS #2, there may be a case where the UE has to transmit an uplink signal to the BS #2. In this case, the UE transmits the uplink signal to the BS #2 included in the cell group #1 1415 on the basis of the reference signal and assignment information regarding the SPS resource received from the BS #1.

The above process is summarized in that the UE may transmit the uplink signal by using the same SPS resource and reference signal in the same cell group (herein, the cell group #1). That is, the UE is previously assigned the SPS resource and the reference signal from the BS #1 of which a connection is set up before moving to the cell supported by the BS #2, and if the UE moves to the cell supported by the BS #2, may transmit the uplink signal to the BS #2 by using the pre-assigned SPS resource and reference signal.

Since the UE can transmit the uplink signal to the BS #2 by using the pre-assigned SPS resource and reference signal, the UE may do not set up a connection with the BS #2. In other words, the UE may transmit the uplink signal without having to perform a handover to the BS #2. The UE maintains an RRC connection with the BS #1.

Next, a case where the UE transmits the uplink signal by moving to the cell not included in the cell group is described with reference to FIG. 15.

The UE receives cell group information from a BS #1 of which a connection is set up (S1510). The cell group information is information indicating which cell is included in the cell group, and in this case, may correspond to information regarding a cell group #1 1515. Upon receiving the cell group information in step S1510, the UE may know that the BS #1 and a BS #3 are not included in the same cell group. That is, a cell supported by the BS #1 and a cell supported by the BS #3 are included in different cell groups (cell group #1, cell group #2). The UE receives a reference signal and assignment information regarding an SPS resource for transmission of the uplink signal for the cell group #1 from the BS #1 (S1520).

In this case, there may be a case where the UE moves to the cell supported by the BS #1 to the cell supported by the BS #3 and thus the UE has to transmit the uplink signal to the BS #3. First, the UE may request the BS #3 to perform a connection setup (S1530). The connection setup may be an RRC connection setup and/or a data connection setup. If the BS #3 allows the connection setup with the UE, the UE may receive a connection setup response from the BS #3 (S1540). If the connection setup is performed between the UE and the BS #3, the UE releases the connection with the BS #1. According to a connection setup request/response, the UE of which a connection is set up with the BS #3 newly receives information regarding a cell group #2 and a reference signal and assignment information regarding an SPS resource from the BS #3 (S1550). That is, since the UE transmits the uplink signal by using the SPS resource and the reference signal for each cell group, a reference signal and assignment information regarding an SPS resource different from pre-assigned information must be newly received starting from the BS #3 belonging to a different cell group.

The UE transmits the uplink signal to the BS #2 included in the different cell group (cell group #2 1516) on the basis of the reference signal and assignment information regarding the SPS resource received from the BS #3.

In summary, although the UE may be pre-assigned the SPS resource and the reference signal from the BS #1 of which a connection is setup before moving to the cell supported by the BS #3, the reference signal and SPS resource assigned from the BS #1 may be used only in the cell group #1 1515, and are not necessarily used also in the cell group #2 1516. Accordingly, if the UE moves to the cell supported by the BS #1, the uplink signal may be transmitted to the BS #3 by using a reference signal and SPS resource newly assigned from the BS #3.

Since the UE may transmit the uplink signal to the BS #3 by using the newly assigned SPS resource and reference signal, the UE must set up a connection with the BS #3. In other words, the UE may transmit the uplink signal after performing a handover to the BS #3.

Figure 16:
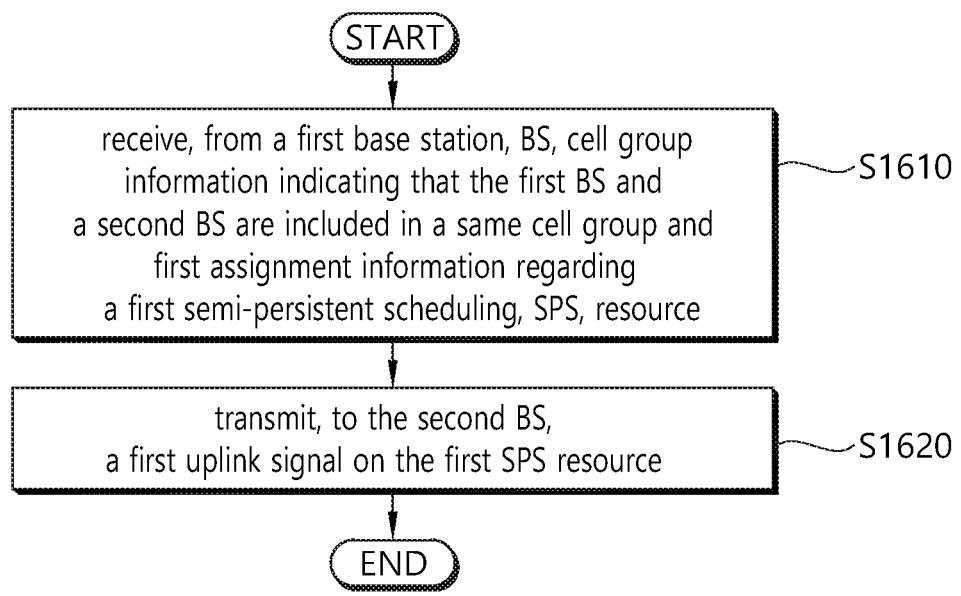
FIG. 16 is a flowchart showing a procedure of transmitting uplink data based on connectionless transmission in a multi-cell according to an embodiment of the present specification.

FIG. 16 is a flowchart showing a procedure of transmitting uplink data based on connectionless transmission in a multi-cell according to an embodiment of the present specification.

First, a terminology is summarized. Connectionless transmission may correspond to data transmission from a UE to a BS in an idle state. Connection transmission may correspond to data transmission from the UE to the BS after an RRC connection and a data connection are set up with the BS. A 1st BS may correspond to the BS #1 in FIG. 14 and FIG. 15. A 2nd BS may correspond to the BS #2 in FIG. 14. A 3rd BS may correspond to the BS #3 in FIG. 15. An RRC connection is set up between the UE and the 1st BS.

First, in step S1610, the UE receives, from the 1st BS, cell group information indicating that the 1st BS and a 2nd BS are included in the same cell group. The cell group information is information indicating which cell is included in a corresponding cell group. Herein, the cell group information indicates that a cell supported by the 1st BS and a cell supported by the 2nd BS are included in the same cell group. That is, upon receiving the cell group information, the UE may know that the 1st BS and the 2nd BS are included in the same cell group. The UE receives from the 1st BS 1st assignment information regarding a 1st semi-persistent scheduling (SPS) resource.

In step S1620, if the UE moves from a cell supported by the 1st BS to a cell supported by the 2nd BS, there may be a case where the UE must transmit an uplink signal to the 2nd BS. In this case, the UE transmits a 1st uplink signal to the 2nd BS on the 1st SPS resource.

The 1st assignment information received from the 1st BS further relates to a 1st reference signal. The 1st uplink signal transmitted to the 2nd BS includes the 1st reference signal.

Since the reference signal is a reference signal for data demodulating, it may correspond to a demodulation reference signal (DMRS). The DMRS is a reference signal used for channel estimation for demodulating a received signal. The DMRS can be transmitted in combination with the PUSCH or PUCCH. In the next generation wireless communication system, since the UL OFDMA is applied, the reference signal can be time multiplexed with the uplink signal or time/frequency multiplexed with the uplink signal.

That is, the UE may transmit uplink signals to BSs in the same cell group by using the same SPS resource and reference signal for the same cell group. That is, the UE may receive from the 1st BS the 1st reference signal and the 1st assignment information regarding the 1st SPS resource before moving to the cell supported by the 2nd BS. If the UE moves to the cell supported by the 2nd BS, the 1st uplink signal may be transmitted to the 2nd BS by using the 1st reference signal and the 1st assignment information regarding the 1st SPS resource received from the 1st BS.

Since the UE may transmit the 1st uplink signal to the 2nd BS by using the 1st SPS resource and reference signal pre-assigned from the 1st BS, the 1st uplink signal may be transmitted in a state where no RRC connection is set up between the UE and the 2nd BS. Even if the 1st BS moves from the cell supported by the 1st BS to the cell supported by the 2nd BS, the UE may transmit the 1st uplink signal without having to perform a handover to the 2nd BS. That is, the UE maintains the RRC connection with the 1st BS.

In addition, uplink transmission in the wireless communication system uses resource blocks each spanning a number M of orthogonal frequency division multiplexing, OFDM, symbols and a number N of subcarriers.

The 1st uplink signal may be transmitted through the remaining resources other than a specific resource among the 1st SPS resources, and the specific resource may include a symbol or subcarrier in which an interference occurs due to an uplink synchronization mismatch. Since the UE transmits the 1st uplink signal in a state where the RRC connection is not set up with the 2nd BS (the UE does not perform the handover to the 2nd BS), uplink synchronization may be mismatched between the UE and another cell in a cell group. Therefore, some resources among the 1st SPS resources in which the interference occurs due to the uplink synchronization mismatch need to be unoccupied so as not to overlap with other signals.

That is, the 1st uplink signal is transmitted to the 2nd BS on the 1st SPS resource comprising at least one resource block while leaving unoccupied some resource elements of the at least one resource block.

More specifically, the unoccupied resource elements include L1 foremost OFDM symbols and L2 rearmost OFDM symbols of the at least one resource block, where L1 and L2 are integers greater than or equal to 0 and L1+L2 is an integer greater than or equal to 1. Also, the unoccupied resource elements include L'1 uppermost subcarriers and L'2 lowermost subcarriers of the at least one resource block, where L'1 and L'2 are integers greater than or equal to 0 and L'1+L'2 is an integer greater than or equal to 1.

In addition, the 1st uplink signal may be transmitted after the UE performs a random access procedure with the 2nd BS to match uplink synchronization. If the UE moves to a cell in a cell group of which a connection is not set up, the UE may match the uplink synchronization through the random access procedure. However, in the random access procedure, only a step of transmitting a random access preamble and receiving a random access response is performed, and subsequent steps corresponding to a connection setup process are not performed.

If the UE moves from the cell supported by the 1st BS to a cell supported by a 3rd BS, there may be case where the UE must transmit an uplink signal to the 3rd BS. The 3rd BS is not included in the same cell group including the 1st BS. In this case, the UE sets up an RRC connection with the 3rd BS, and thereafter receives 2nd assignment information regarding a 2nd SPS resource from the 3rd BS. In doing so, the UE releases a previous RRC connection with the 1st BS. The UE transmits a 2nd uplink signal to the 3rd BS on the 2nd SPS resource.

The 2nd assignment information received from the 3rd BS further relates to a 2nd reference signal. The 2nd uplink signal transmitted to the 3rd BS includes the 2nd reference signal.

Since the reference signal is a reference signal for data demodulating, it may correspond to a demodulation reference signal (DMRS). The DMRS is a reference signal used for channel estimation for demodulating a received signal. The DMRS can be transmitted in combination with the PUSCH or PUCCH. In the next generation wireless communication system, since the UL OFDMA is applied, the reference signal can be time multiplexed with the uplink signal or time/frequency multiplexed with the uplink signal.

That is, since the UE transmits an uplink signal by using the same SPS resource and reference signal for each cell group, the 2nd reference signal and the 2nd assignment information regarding the 2nd SPS resource which are different from the 1st reference signal and the 1st assignment information regarding the 1st SPS resource previously received from the 1st BS must be newly received from the 3rd BS belonging to a different cell group.

In other words, although the 1st SPS resource and reference signal may be pre-assigned from the 1st BS before the UE moves to the cell supported by the 3rd BS, the 1st reference signal and 1st SPS resource assigned from the 1st BS can be used only in a cell group to which the 1st BS belongs, and it does not mean that the 1st SPS resource and the 1st reference signal are also used in another cell group. Therefore, if the UE moves to the cell supported by the 3rd BS, the 2nd uplink signal may be transmitted to the 3rd BS by using the 2nd reference signal and the 2nd SPS resource newly assigned from the 3rd BS.

Since the UE must receive the 2nd reference signal and the 2nd assignment information regarding the 2nd SPS resource from the 3rd BS, the UE must set up an RRC connection with the 3rd BS. That is, the UE may transmit the 2nd uplink signal after performing a handover to the 3rd BS.

Before the UE sets up the RRC connection with the 3rd BS, the UE may transmit information regarding the cell supported by the 1st BS to the 3rd BS. This is an operation in which information of a cell in which the UE sets up a connection most recently (the cell supported by the 1st BS) is reported to a new cell (the cell supported by the 3rd BS) in order to rapidly set up a connection with the new cell.

In addition, after the UE sets up the RRC connection with the 3rd BS, the UE may receive information regarding a modulation scheme and a coding rate from the 3rd BS.

In addition, the 1st assignment information regarding the 1st SPS resource may be received by using a temporary identifier for SPS. The temporary identifier for the SPS may correspond to an SPS-RNTI. The temporary identifier for the SPS may correspond to the 1st reference signal and 1st SPS resource transmitted by a plurality of cells included in the same cell group. That is, if the UE uses the temporary identifier for the SPS, the UE may receive information related to uplink scheduling from the 2nd BS of which the RRC connection is not set up. The temporary identifier for the SPS is valid in the same cell group to which the 1st BS and the 2nd BS belong.

In addition, the 1st BS may deliver to the 2nd BS information regarding the 1st SPS resource, the 1st reference signal, a modulation scheme and a coding rate, a service requirement and service characteristic, routing of a core network, the temporary identifier for SPS. The first BS further delivers to the second BS at least one of an encryption key applied to the 1st uplink signal, and a UE identifier.

In addition, there may be a case where, although the 2nd BS receives the 1st uplink signal through the 1st SPS resource from the UE, the 2nd BS desires to receive the 1st uplink signal by using another SPS resource or another reference signal or another modulation scheme and coding rate. In this case, the UE receives from the 2nd BS a paging signal including SPS resource change information. The UE transmits a 3rd uplink signal (or a further uplink signal) on the basis the SPS resource change information to the 2nd BS. The SPS resource change information is masked by the 2nd BS by using the temporary identifier for SPS. The SPS resource change information may be received by using the temporary identifier for SPS.

Figure 17:
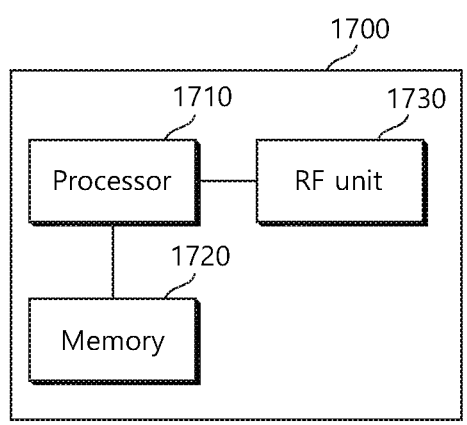
FIG. 17 is a block diagram showing an apparatus for wireless communication for implementing an embodiment of the present invention.

FIG. 17 is a block diagram showing an apparatus for wireless communication for implementing an embodiment of the present invention.

An apparatus 1700 for wireless communication includes a processor 1710, a memory 1720 and a radio frequency (RF) unit 1730.

The processor 1710 may be configured to implement proposed functions, procedures and/or methods described in this description. Layers of the radio interface protocol may be implemented in the processor 1710. The processor 1710 may handle a procedure explained above. The memory 1720 is operatively coupled with the processor 1710, and the RF unit 1730 is operatively coupled with the processor 1710.

The processor 1710 may include application-specific integrated circuit (ASIC), other chipset, logic circuit and/or data processing device. The memory 1720 may include read-only memory (ROM), random access memory (RAM), flash memory, memory card, storage medium and/or other storage device. The RF unit 1730 may include baseband circuitry to process radio frequency signals. When the embodiments are implemented in software, the techniques described herein can be implemented with modules (e.g., procedures, functions, and so on) that perform the functions described herein. The modules can be stored in memory 1720 and executed by processor 1710. The memory 1720 can be implemented within the processor 1710 or external to the processor 1710 in which case those can be communicatively coupled to the processor 1710 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for transmitting, by a user equipment, UE, uplink data in a wireless communication system including a plurality of cells, the method comprising, at the UE:
   receiving, from a first base station, BS, cell group information indicating that the first BS and a second BS are included in a same cell group and first assignment information regarding a first semi-persistent scheduling, SPS, resource; and
   transmitting, to the second BS, a first uplink signal on the first SPS resource.

2. The method of claim 1, wherein the first assignment information received from the first BS further relates to a first reference signal, wherein the first uplink signal transmitted to the second BS includes the first reference signal.

3. The method of claim 1, further comprising, if the UE moves to a cell supported by the first BS to a cell supported by the second BS, maintaining, by the UE, a radio resource control, RRC, connection with the first BS, wherein the first uplink signal is transmitted in a state where no RRC connection is set up between the UE and the second BS.

4. The method of claim 1,
   wherein uplink transmission in the wireless communication system uses resource blocks each spanning a number M of orthogonal frequency division multiplexing, OFDM, symbols and a number N of subcarriers,
   wherein the first uplink signal is transmitted to the second BS on the first SPS resource comprising at least one resource block while leaving unoccupied some resource elements of the at least one resource block.

5. The method of claim 4,
   wherein the unoccupied resource elements include L1 foremost OFDM symbols and L2 rearmost OFDM symbols of the at least one resource block, where L1 and L2 are integers greater than or equal to 0 and L1+L2 is an integer greater than or equal to 1.

6. The method of claim 5,
   wherein the unoccupied resource elements include L' 1 uppermost subcarriers and L' 2 lowermost subcarriers of the at least one resource block, where L' 1 and L' 2 are integers greater than or equal to 0 and L' 1+L' 2 is an integer greater than or equal to 1.

7. The method of claim 1,
   wherein the first uplink signal is transmitted after the UE performs a random access procedure with the second BS to match uplink synchronization.

8. The method of claim 1, further comprising,
if the UE moves from a cell supported by the first BS to a cell supported by a third BS not included in the same cell group including the first and second BS,
after setting up a radio resource control, RRC, connection with the third BS by the UE, receiving, from the third BS, second assignment information regarding a second SPS resource; and
transmitting, to the third BS, a second uplink signal on the second SPS resource, and
releasing a previous RRC connection with the first BS.

9. The method of claim 8, wherein the second assignment information received from the third BS further relates to a second reference signal, wherein the second uplink signal transmitted to the third BS includes the second reference signal.

10. The method of claim 9, further comprising:
before the UE sets up the RRC connection with the third BS, transmitting information regarding the cell supported by the first BS to the third BS; and
after the UE sets up the RRC connection with the third BS, receiving information regarding a modulation scheme and a coding rate from the third BS.

11. The method of claim 1,
wherein the assignment information regarding the first SPS resource is received by using a temporary identifier for SPS, and
wherein the temporary identifier for SPS is valid only in the same cell group to which the first BS and the second BS belong.

12. The method of claim 1,
wherein the first BS delivers to the second BS information regarding the first SPS resource, a first reference signal, a modulation scheme and a coding rate, a service requirement and service characteristic, routing of a core network and a temporary identifier for SPS.

13. The method of claim 12, wherein the first BS further delivers to the second BS at least one of an encryption key applied to the first uplink signal and a UE identifier.

14. The method of claim 1, further comprising:
receiving, from the second BS, a paging signal including SPS resource change information; and
transmitting, to the second BS, a further uplink signal on the basis of the SPS resource change information,
wherein the SPS resource change information is masked by the second BS by using a temporary identifier for SPS, and
wherein the SPS resource change information is received by using the temporary identifier for SPS.

15. A user equipment, UE, for transmitting uplink data in a wireless communication system including a plurality of cells, the UE comprising:
a radio frequency, RF, unit for transmitting and receiving radio signals; and
a processor operatively coupled to the RF unit, wherein the processor is configured to control the RF unit to:
receive, from a first base station, BS, cell group information indicating that the first BS and a second BS are included in the same cell group and first assignment information regarding a first semi-persistent scheduling, SPS, resource; and
transmit, to the second BS, a first uplink signal on the first SPS resource.

* * * * *